United States Patent [19]
Luedke et al.

[11] 3,759,337
[45] Sept. 18, 1973

[54] FISH SCALE

[76] Inventors: Donald M. Luedke, 2605 Maple Hill Ln., Brookfield, Wis. 53005; Robert J. Tongas, 420 Ravenswood Cir., Waukesha, Wis. 53186

[22] Filed: Dec. 4, 1972

[21] Appl. No.: 311,753

[52] U.S. Cl. .................................. 177/172, 177/251
[51] Int. Cl. ........................ G01g 23/14, G01g 1/18
[58] Field of Search .................... 177/171, 172, 246, 177/251

[56] References Cited
UNITED STATES PATENTS
| | | | |
|---|---|---|---|
| 691,437 | 1/1902 | Bogue | 177/171 X |
| 1,484,005 | 2/1924 | Bockel | 177/171 X |

*Primary Examiner*—George H. Miller, Jr.
*Attorney*—Gerald P. Welch

[57] ABSTRACT

A fish scale having handle means for suspending the beam of the scale with a hook adapted for insertion into either one of two apertures in said beam; a hook depending from one end of the beam for holding a fish to be weighed, a transparent fluid receptacle dependent from the opposite end of the beam, a filling aperture at the top of the receptacle, weight indicia for showing weight at various levels of fluid within the receptacle, and means at the lower end of the receptacle for retaining or releasing portions of said fluid from the receptacle.

4 Claims, 3 Drawing Figures

FISH SCALE

SUMMARY OF THE INVENTION

A unitary bar fish scale apertured off center toward the fish suspending end as a fulcrum for weighing fish up to 10 pounds, and apertured further toward said end to serve as a fulcrum to weigh fish between zero and 50 pounds. A handle is provided with an endless depending rope with a hook freely engaged thereon, the said hook to be inserted into one or the fulcrum apertures. At the opposite end of the scale beam is a hook for suspending a fluid container of cylindrical or other appropriate form, equipped at its lower end with a spigot for release of the fluid which serves as a balance weight. The container may be transparent and may be marked with weight indicia which is spaced vertically interiorly or exteriorly of said fluid container.

DETAILED DESCRIPTION

Figure 1:
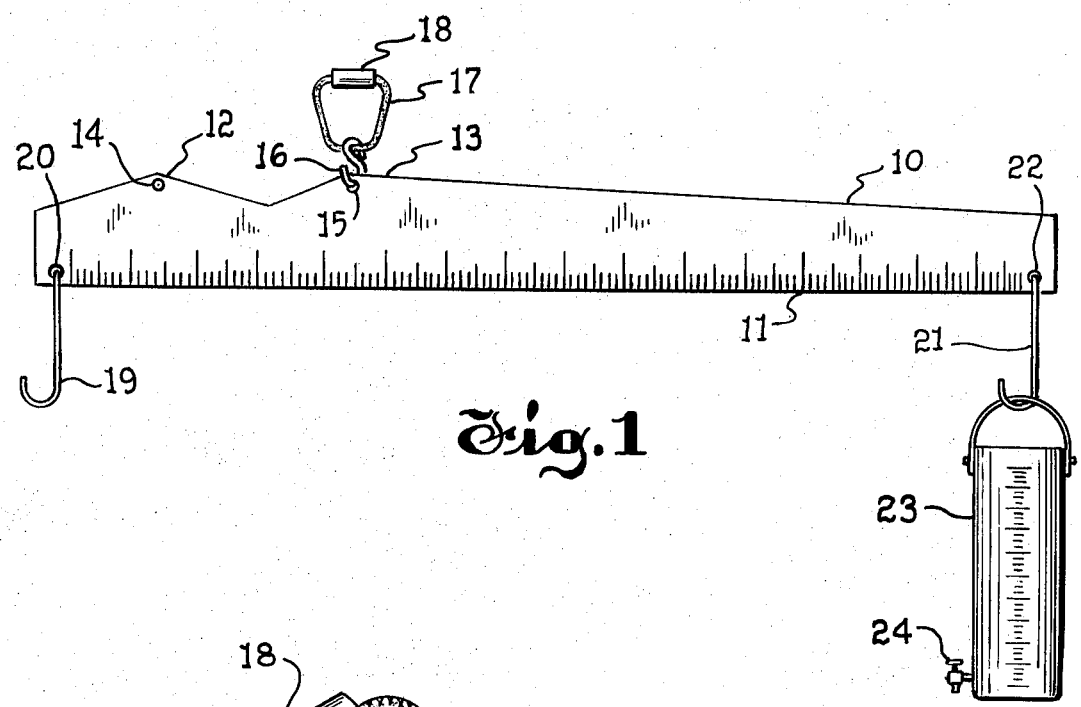
FIG. 1 is a view in elevation of a fish scale embodying the invention.
Figure 2:
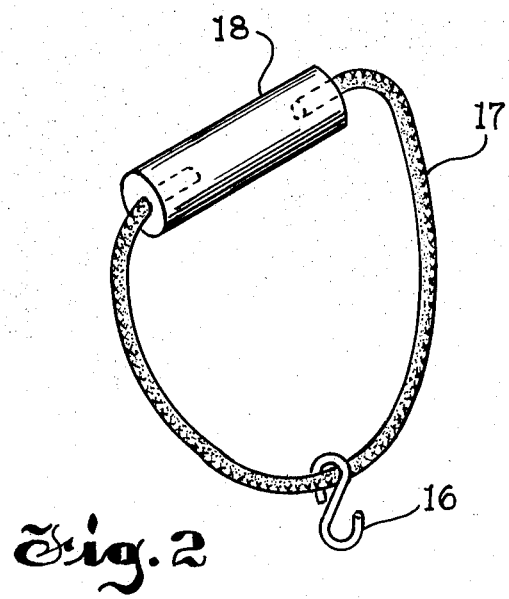
FIG. 2 is a perspective view of the handle and fulcrum hook assembly.
Figure 3:
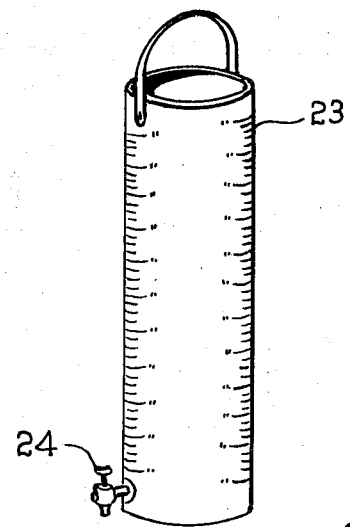
FIG. 3 is a view in perspective of the fluid container.

The beam 10 of the scale has indicia of length along the lower edge thereof 11, and has a doubly serrate upper edge comprising a short serration at one end thereof, and a long uneven serration 13 for the balance of the beam 10.

The apex of each serration 12 and 13 has underlying apertures 14 and 15 to accommodate the fulcrum hook 16 on the cord 17 attached to support handle 18. A fish engaging hook 19 is nung within the aperture at 20. At the opposite end of the beam 10, a hook element 21 is hung within the aperture at 22 for suspending the fluid container 23, the latter having vertically spaced indicia to show the weight as a balance of water therein at various levels. A spigot 24 is provided to release water or other fluid from the container 23.

Having thus described the invention, what is claimed and desired to be secured by Letters Patent of the United States is:

1. A fish scale including a bar beam, a handle, a subjoined hook on said handle, two spaced fulcrum apertures in said bar beam adapted to accommodate said hook, a variable fluid balance weight depending from one end of said bar beam, and means for attaching a fish to be weighed on the other end of said bar beam.

2. A device as in claim 1, and a tubular fluid receptacle as a blance weight depending from an end of said bar beam.

3. A device as in claim 1, and a tubular fluid receptacle as a balance weight, and a spigot at the lower end thereof to vary the water weight therein.

4. A device as in claim 1, and a tubular fluid receptacle as a balance weight, a spigot at the lower end thereof to control the water weight therein, and indicia on the wall of the transparent receptacle showing weight of fluid content at various heights.

* * * * *